April 9, 1929.  P. P. ALEXANDER  1,708,072
ARC WELDING SYSTEM
Original Filed April 1, 1927
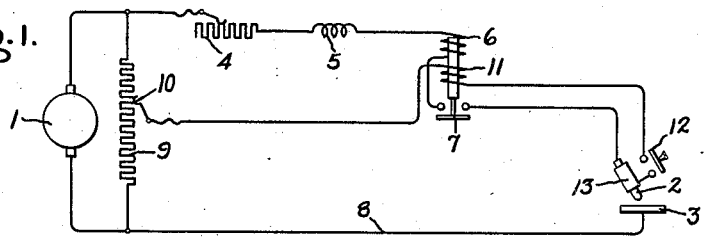
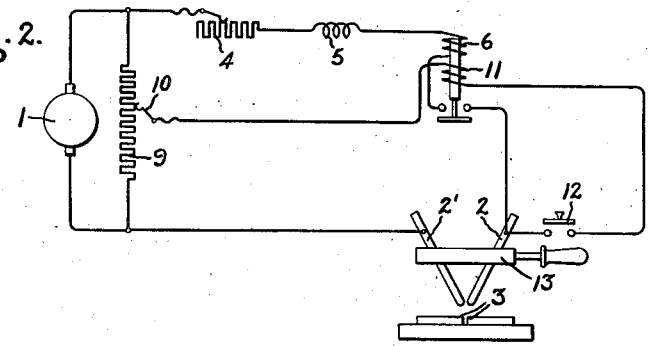
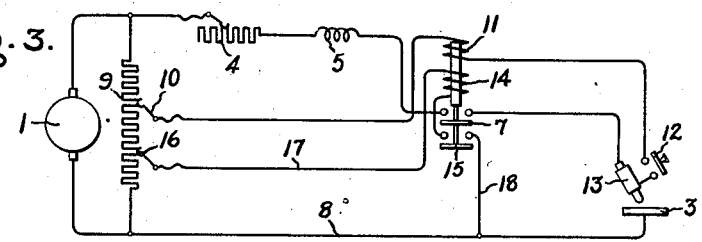
Inventor:
Peter P. Alexander,
by *Alexander S. Lamm*
His Attorney.

Patented Apr. 9, 1929.

1,708,072

UNITED STATES PATENT OFFICE.

PETER P. ALEXANDER, OF MARBLEHEAD, MASSACHUSETTS, ASSIGNOR TO GENERAL ELECTRIC COMPANY, A CORPORATION OF NEW YORK.

ARC WELDING SYSTEM.

Application filed April 1, 1927, Serial No. 180,124. Renewed August 17, 1928.

My invention relates to electrical systems including a plurality of electrodes and a source of supply for said electrodes wherein means are provided for limiting the voltage across the electrodes to a given value on open circuit and for automatically disconnecting said electrodes from the source of supply when the voltage across the electrodes exceeds a predetermined value. More particularly, my invention relates to an arc welding system that may be employed with a high voltage supply source without danger to the operator resulting from his coming in contact with the electrodes on open circuit and that operates at the same time to limit the arc voltage between the electrodes once the circuit is completed.

It frequently happens that the only available source of supply for welding is of such a high voltage that the welding operation is conducted with considerable danger to the operator. Such is often the case when welding from the source of supply used for street railways and electrified railroad systems. Furthermore, there are certain processes of welding that require comparatively high striking and maintaining voltages for the welding operation. Such is the case when welding in an atmosphere of hydrogen.

Other examples of welding where it is desirable or necessary to protect and/or limit the voltage that may be established across the arc during the welding operation will occur to those skilled in the art, and it is in such applications that my invention will prove most useful, but it is, of course, apparent that my invention is not limited to the particular conditions described.

My invention will be useful in manual arc welding, or semi-automatic arc welding, or in fully automatic arc welding. In manual arc welding the operator holds the electrode or electrodes in a suitable holder and strikes and maintains the arc manually. In semi-automatic arc welding, suitable means are provided for automatically feeding the electrode to maintain the arc length constant, and in fully automatic machines means are provided not only for automatically feeding the electrode to maintain the arc length constant, but also for producing relative movement between the electrode or electrodes and the work along the line of the desired weld.

My invention is applicable to systems using fusible electrodes as well as carbon electrodes, and non-consuming electrodes such as tungsten electrodes may be used.

My invention will be better understood from the following description when considered in connection with the accompanying drawing, and its scope will be pointed out in the appended claims.

In the drawing, Fig. 1 diagrammatically represents a system embodying my invention which may be a manual, semi-automatic, or full automatic system where the arc is between a welding pencil and the work. Fig. 2 shows my invention applied to a manual system where the arc is maintained between a plurality of electrodes spaced away from the work; and Fig. 3 shows a modification of Fig. 1.

In the system illustrated in Fig. 1 a load circuit containing the arc is connected to a supply circuit represented as fed by a generator 1. The welding arc is drawn between an electrode or pencil 2 and the work 3. The arc circuit contains an impedance shown as comprising an adjustable resistance 4 and a reactance 5 for stabilizing the arc, a holding coil 6 for a switch 7 included in this circuit, electrode 2, work 3 and a conductor 8. An impedance 9 is shunted across the supply circuit. By means of an adjustable contact 10, an operating coil 11 for switch 7 is connected between an intermediate point of the impedance 9 and a point in the welding circuit between the adjustable impedance comprising resistance 4 and reactance 5 and a load comprising the arc established between the electrode 2 and work 3. A switch 12 is provided in the circuit of coil 11 so that the operator may prevent the operation of the switch 7 when the electrode 2 is in contact with the work. A switch may also be provided between the source of supply and the system for disconnecting the system from the source of supply. Once the welding circuit is completed by the closure of switch 7 through the agency of coil 11, the holding coil 6 operates to maintain the circuit closed. It will be noted that the arrangement comprises in effect a Wheatstone bridge wherein the welding circuit forms one branch of the bridge and the fixed impedance 9 the other branch with the coil 11 connected in the bridge or galvanometer circuit. The open circuit voltage across the electrode 2 and work 3 will depend upon the position of the adjustable contact 10 on the impedance 9. This will likewise determine under operating conditions the extent of the voltage drop across the arc established between electrode 2 and the work 3 as will appear from the following description of the operation of my invention. The electrode 2 is supported in an electrode holder or tool diagrammatically illustrated at 13. In manual arc welding 13 will be any suitable electrode holder, examples of which are well known in the art. In semi-automatic arc welding, 13 will be the tool portion of the flexible conduit used to feed the electrode toward the work, and, in automatic arc welding, 13 will be the nozzle or equivalent device used to direct the electrode toward the work. The switch 12 will be placed generally conveniently near the operator and in the case of manual or semi-automatic arc welding may be placed on the member 13.

When the operator closes the switch 12 and the electrode 2 is not in engagement with the work 3, the switch 7 remains open as illustrated, since the circuit of the operating coil 11 connecting it to the source of supply is interrupted at the electrode 2. When the operator brings the electrode 2 into engagement with the work 3, a circuit through coil 11 is established and switch 7 will be closed. The circuit thus completed through coil 11 is as follows: Generator 1, a portion of impedance 9, contact 10, coil 11, switch 12, electrode 2, work 3, and conductor 8 back to the source of supply 1. After switch 7 has been closed through the action of the operating coil 11, the holding coil 6 operates to maintain the welding circuit closed. It will be noted that the voltage drop across the electrode 2 and work 3, when switch 12 is closed, and the electrodes are separated, is limited to the voltage drop across that portion of the impedance 9 between contact 10 and the connection 8 which is only a portion of the voltage of the generator 1 across whose terminals the impedance is connected. The voltage that may appear at the welding tool is, therefore, limited by the adjustment of the contact 10 on the impedance 9.

As long as the voltage drop across the arc established between the electrode 2 and work 3 is not equal to or greater than the voltage drop in the impedance 9 between the adjustable contact 10 and the conductor 8, the operating coil 11 will assist the holding coil 6 in maintaining the welding switch 7 closed thus completing the connection of the welding circuit with the source of supply. When, however, the arc voltage between the electrode 2 and work 3 exceeds the voltage drop in the impedance 9 between the adjustable contact 10 and the conductor 8, the direction of current flow in coil 11 will be reversed, and its effect will be in opposition to the effect of the holding coil 6 so that when the arc attains a voltage greater by a certain predetermined amount than the voltage drop across the impedance 9 between the adjustable contact 10 and the conductor 8 the current in coil 11 will neutralize the effect of the current in coil 6 and open the switch 7 thus interrupting the welding circuit. It thus appears that by the arrangement described not only the voltage difference between the electrode 2 and work 3 on open circuit is determined by the system described, but also that, under welding conditions, the maximum arc voltage is likewise determined. The means for controlling the switch 7, it will be seen, comprises a coil 11 arranged to be responsive to the difference in potential between the pencil 2 and the point 10 on the shunt impedance 9.

Fig. 2 is similar to Fig. 1 with the exception that in Fig. 2 the welding operation is performed through the agency of an arc maintained between electrodes 2 and 2'. These electrodes may be of carbon or some refractory metal such as tungsten and the welding operation performed by fusing the work parts 3 together through the action of the arc sprung between the electrodes 2 and 2'. A filler rod may be placed along the seam or fed into the arc to reinforce the seam during the welding operation by supplying additional material to the seam. The operation of the protective system is the same as that described in connection with Fig. 1.

In Fig. 3, the arrangement in Fig. 1 has been modified slightly to illustrate one way in which the holding coil 6 in Fig. 1 which is responsive to the current flowing in the welding circuit may be energized from a suitable source of voltage. In Fig. 3, the holding coil 14 has its circuit completed by a switch member 15 when switch 7 to which it is attached is closed through the action of the operating coil 11. Holding coil 14 receives its energy by reason of the voltage drop across a portion of the impedance 9, the circuit being completed as follows: Impedance 9, adjustable contact 16, conductor 17, holding coil 14, switch 15, conductor 18 and conductor 8 back to impedance 9. In the arrangement shown in Fig. 3, the magnetic intensity of the holding coil 14 will remain substantially constant throughout the welding operation despite changes in the welding current. The operating coil 11 will operate against the holding coil 14 in the same manner as has been described in connection with Fig. 1 for opening the welding circuit when the voltage across the arc established between the electrode 2 and work 3 attains a value in excess of that for which the system is adjusted. With the exception of the added adjustment made possible through adjustable contact 16 which is effective in controlling the effect of the holding coil 14 the operation of the system shown in Fig. 3 is the same as that illustrated in Fig. 1 or Fig. 2 and for this reason will not be repeated here.

What I claim as new and desire to secure by Letters Patent of the United States is:

1. An electrical system comprising a Wheatstone bridge one branch of which comprises an impedance and the other branch of which comprises an impedance, a switch and a load device, a holding coil in series with the load device for said switch and an operating coil for said switch connected in the bridge circuit extending from an intermediate point of the impedance in the first branch to a point between the impedance and the load device in the other branch, said operating coil being connected to be energized while said load circuit is completed.

2. An electrical system for supplying an arc adapted to be drawn between a pair of electrodes, a load circuit comprising the arc connected in parallel with said impedance, a second impedance in series with the arc, a switch, a holding coil in series with the arc for said switch, and an operating coil for said switch adjustably connected to an intermediate point of said first impedance and to the load circuit between the arc and the impedance in said load circuit, said operating coil being arranged to be energized when the arc circuit is completed.

3. A control system for electric arc welding systems of the type wherein the arc is drawn between a welding pencil and the work, a supply circuit for the arc, an impedance shunted across said supply circuit, a series impedance connected between the supply circuit and the pencil, a switch for controlling the circuit through the arc, and means for controlling the operation of said switch comprising a coil arranged to be connected between the pencil and an intermediate point on said shunt impedance and a holding coil for said switch in series with the arc, said operating coil being connected to be energized when the arc circuit is completed.

4. In an electric arc welding system, a welding circuit comprising an impedance, a switch, a holding coil therefor energized under operating conditions, and a plurality of electrodes, a second impedance connected in parallel to said welding circuit and an operating coil energized under operating conditions for said switch connected to an intermediate point of said second impedance and to the load circuit between said first mentioned impedance and said electrodes.

5. In an arc welding system, a welding circuit connected to said supply comprising a variable impedance, a switch, a holding coil therefor energized under operating conditions and a plurality of electrodes forming one branch of a Wheatstone bridge, a fixed impedance connected across said supply and forming the second branch of said Wheatstone bridge and a coil connected in the bridge circuit of said bridge between an intermediate point of said fixed impedance and the welding circuit between said electrodes and said adjustable impedance for closing said switch when the electrodes are brought together to strike an arc and for overcoming the effect of said holding coil when the voltage of the arc between said electrodes exceeds a given value determined by the adjustment of the connection to said fixed impedance.

In witness whereof, I have hereunto set my hand this 29th day of March, 1927.

PETER P. ALEXANDER.